Patented Feb. 27, 1923.

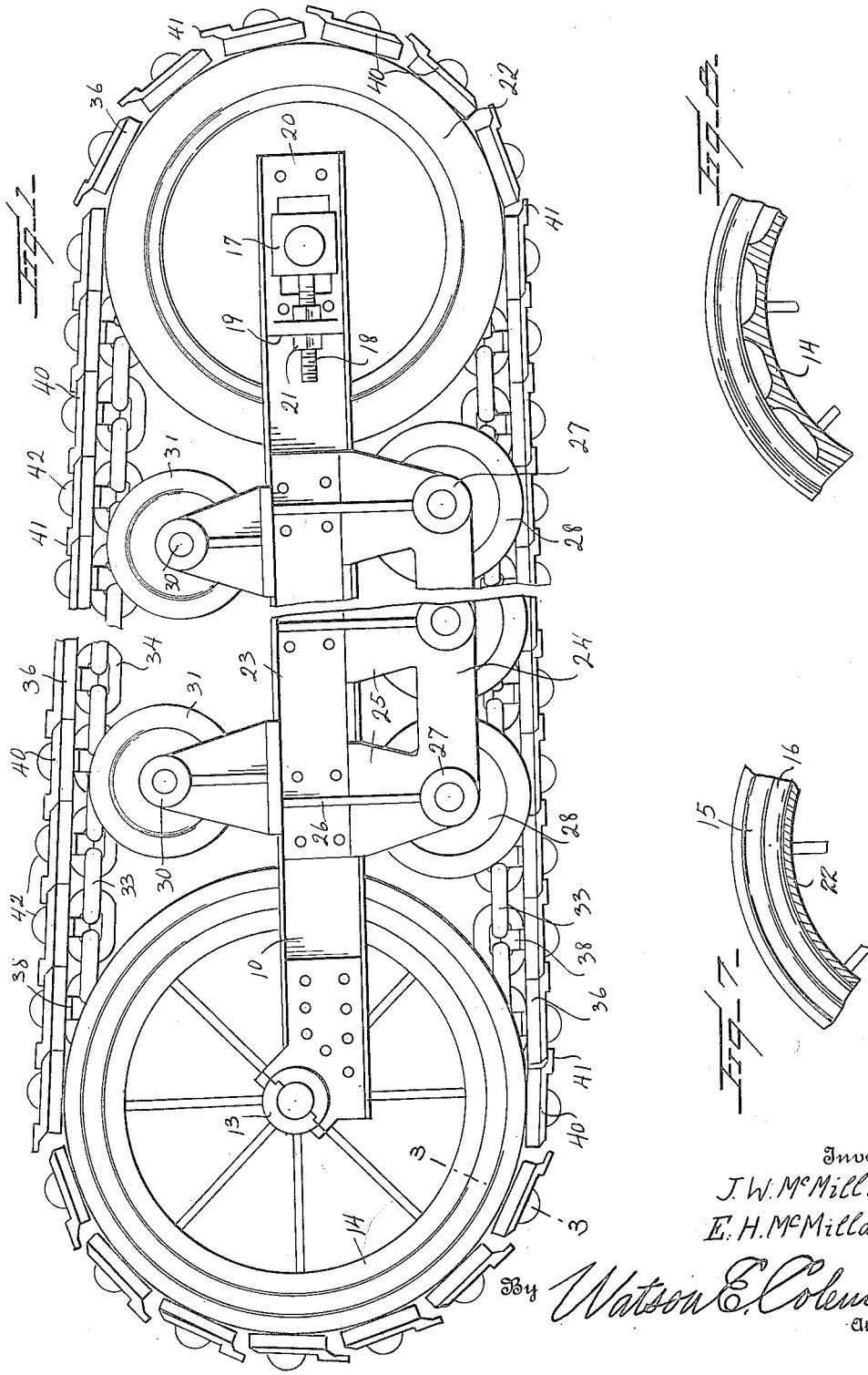

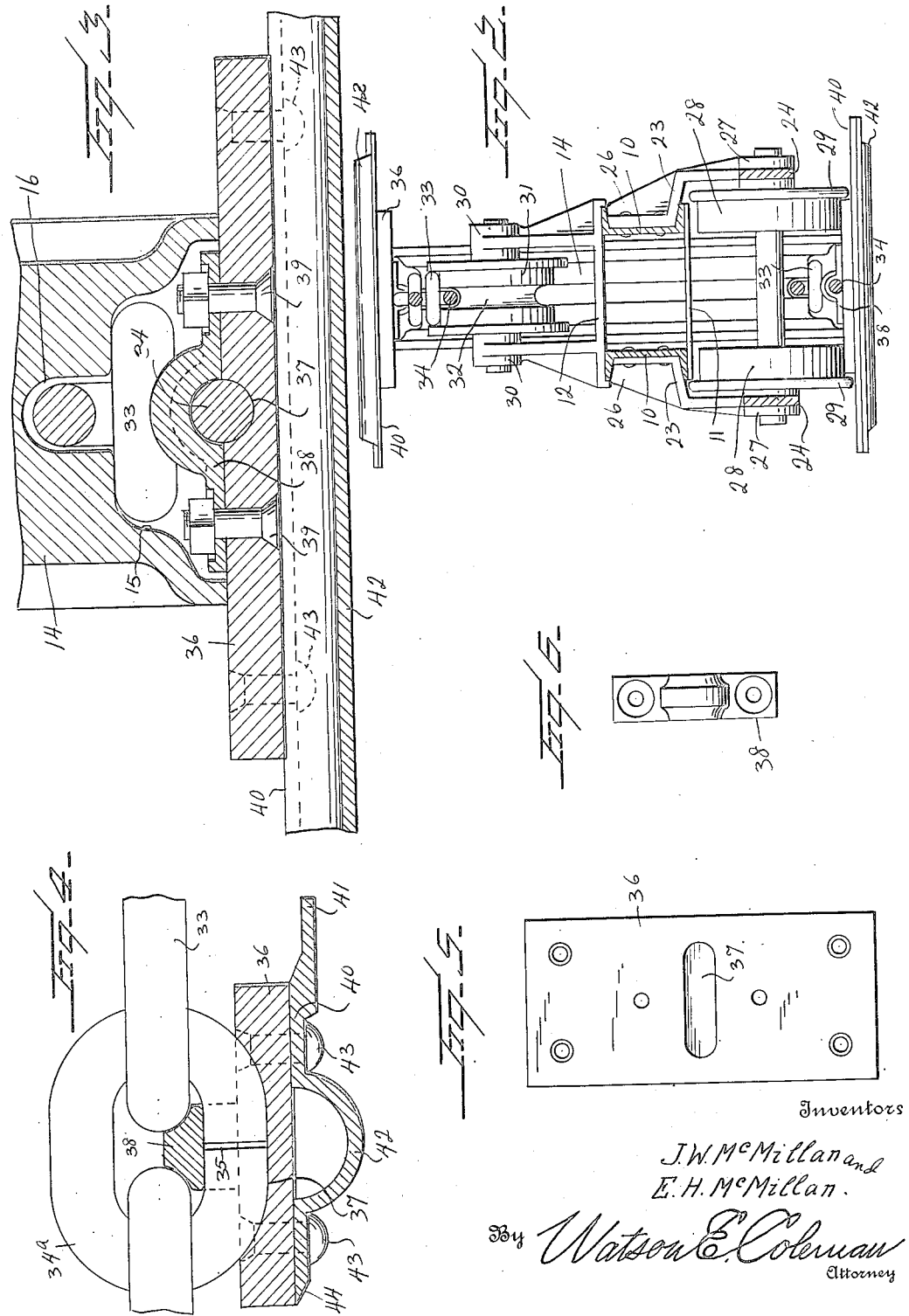

1,446,712

UNITED STATES PATENT OFFICE.

JAMES W. McMILLAN, OF SANTA CRUZ, AND EDWARD H. McMILLAN, OF OAKLAND, CALIFORNIA.

ENDLESS-CHAIN DRIVE FOR TRACTORS.

Application filed August 30, 1919. Serial No. 320,826.

*To all whom it may concern:*

Be it known that we, JAMES W. McMILLAN and EDWARD H. McMILLAN, citizens of the United States, residing at Santa Cruz and Oakland, California, respectively, in the counties of Santa Cruz and Alameda, respectively, and State of California, have invented certain new and useful Improvements in Endless-Chain Drives for Tractors, of which the following is a specification, reference being had to the accompanying drawings.

This invention relates to endless elements in the nature of sprocket chains, and particularly to endless chains of creepers for driving tractors and other like machinery by engagement with the ground.

The general object of this invention is the provision of an endless element of this character including a length of chain and a link connecting the ends of the length of chain, and means for holding said link closed without the necessity of using a pin.

A further object is to provide an endless element composed of links connected to each other without the use of pins.

Another object is to provide an endless chain creeper for tractors and provide a mounting therefor which can be applied to all makes of endless chain or track laying tractors.

A further object is to provide means for supporting the creeper which will eliminate all tendency of the endless chain to jump from its track, and in this connection to provide means for preventing the upper flight of the chain from sagging or whipping while in motion.

Other objects will appear in the course of the following description.

Our invention is illustrated in the accompanying drawings, wherein:—

Figure 1 is a side elevation of a tractor crawler constructed in accordance with my invention;

Figure 2 is a vertical section of the construction shown in Figure 1;

Figure 3 is a fragmentary section on the line 3—3 of Figure 1;

Figure 4 is a fragmentary transverse section of the plate 36, the shoe and the clamp;

Figure 5 is a face view of the plate 36;

Figure 6 is a face view of the clamp 38;

Figure 7 is a fragmentary vertical sectional view of the idler.

Figure 8 is a fragmentary view of the rim of the driving wheel.

Referring to these drawings, it will be seen that we have illustrated a driving unit for a tractor which consists of a main supporting frame comprising laterally disposed channel irons 10. These beams 10 are of steel of ordinary commercial design and have a length and cross sectional area commensurate with the style of tractor to which they are applied and to the work to be done. These channel irons are connected by cross braces or webs 11 attached to the lower flanges of the channel iron and at intervals by transverse webs 12 which act as supporting brackets for chain supporting rollers, which will be later described.

Carried upon an end of the beams 10 is a bearing 13 of any suitable character which is rigidly fastened to the channel irons and carries the bull wheel or main drive wheel 14, whose periphery is formed to provide a relatively wide main channel 15 having outwardly flaring side walls and a medially disposed, deeper channel 16. This portion 16 may be formed to engage with the individual links of the chain like a sprocket wheel (see Figure 8). At the opposite end of the main frame formed of the channel beams 10, the beams are slotted for the reception of a sliding bearing 17, which is mounted in the slot and has a screw-threaded shank 18 passing through the outwardly projecting web 19 of a plate 20, riveted or otherwise attached to the channel iron, this screw-threaded shank being provided with oppositely disposed adjusting nuts 21 whereby the bearings 17 may be shifted to adjust the idler wheel 22. The periphery of the idler wheel 22 is also formed with a main channel 15 and a deeper, medially disposed channel 16 to receive the chain. Power is to be applied to the bull wheel or main drive wheel 14 in any suitable manner (not shown). For instance, this main drive wheel may be driven by an internal gear and pinion in an obvious manner.

Attached to each channel iron 10 is a longitudinally extending casting 23 which is riveted, bolted, or otherwise attached to the channel iron, and which is provided with a longitudinally extending portion 24 connected at intervals to the body 23 by webs 25. This casting is braced by vertical ribs 26 and these castings are formed to provide bearings 27 for the axles of supporting wheels 28 which bear against the lower flight of the endless element and each of which has a flange 29 at its outer edge. These wheels 28 are spaced relatively wide apart, the casting 23 being extended laterally outward and downward from the beams 10, as illustrated in Figure 2.

Mounted upon the beams 10, as before stated, are brackets for supporting the upper flight of the endless element, these brackets comprising a transversely extending web engaging over the upper flanges of the beams 10 and upwardly projecting standards carrying bearings 30 for the idler wheels 31, these wheels being grooved, as at 32.

The endless element comprises a chain formed of links 33 and 34, these links being disposed alternately in planes at right angles to each other, and the end links of the length of chain being connected to each other by a link 34$^a$, as shown in Figure 4, which is split, at 35. Attached to each alternate link, that is each link which extends in a plane parallel to the plane of rotation of the bull wheel, is a track plate 36. This plate is oblong in form and upon its upper face is formed with a transversely semi-circular, longitudinally arcuate recess 37, which is formed to fit the corresponding link 34 or 34$^a$. In order to connect the track plate to the link 34 or the link 34$^a$, we provide a chain fastening clamp 38 for each plate 36. This clamp bows upward, extends transversely of the link, and fits over the upper portion thereof, and is attached to the plate 36 by bolts 39. The inner face of this clamp 38 is complementary to the recess 37 so that the link 34 or 34$^a$ is held within this clamp but permitted to have lateral rotation therein to some extent. The inner corners of the clamp are chamfered or recessed to accommodate the ends of the link 33 and hold these links in spaced relation but permit their rotation relative to each other.

Attached to each plate 36 is a grouser plate or shoe 40. This is made of pressed steel and has a length somewhat greater than the length of the plate 36 so as to project beyond the plate, as at 41. It has a width considerably greater than the width of the plate 36, to which it is attached. The middle of this plate is pressed to form a transversely extending, hollow bead or boss 42, and the grouser plate or shoe is riveted to the plate 36 by the rivets 43. The bead 42 extends transversely of the shoe 40 but terminates short of the ends of the shoe. One edge of the shoe is bevelled, as at 44, while the opposite end of the shoe extends beyond the plate 36, as at 41, and is relatively thicker than the body portion of the plate adjacent to the rivet 43.

When it is desired to connect a length of chain so as to form an endless chain, the link 34$^a$ is opened by heating the link, then the adjacent links 33 are inserted in the link 34$^a$ and the link 34$^a$ is closed until the cut ends of the link come within about $\frac{1}{4}''$ of each other. The corresponding clamp 38 is then disposed over the slitted portion of the link 34$^a$. It holds the link closed and prevents its opening. Each of the links 34 is connected to its corresponding track plate 36 by the corresponding clamp 38. Driving power is communicated to the endless element through the bull wheel 14 and slack in this endless element is taken up by adjusting the bearings 17 for the idler 22. The upper flight of the chain forming the endless element is supported by the idler wheels 31 and the links 34 engage in the groove 32 of each idler wheel, thus preventing any lateral movement or swaying of the upper flight of the chain. The links 33 rest upon the peripheral faces of the wheels 31 and between their marginal flanges 31 so that the chain is fully supported against vertical vibratory movement and against lateral vibratory movement. This is particularly necessary, inasmuch as this construction eliminates all tendency of the supporting wheel to jump its track, which is common in nearly all track laying tractors. The member 41 constitutes a spur which, as the tractor moves forward, will engage with the ground, as illustrated at the left hand end of Figure 1 so as to secure a good grip of the creeper on the ground, and the boss 42 will, of course, be forced into the ground to aid in this tractive effect.

It will be seen that no pins or like contrivances are used for connecting the links of the chain or connecting the track plates and shoes to the endless chain. The chain composed of the links 33 and 34 is of ordinary or commercial form and the clamps 38 provide a simple and efficient means for connecting the shoes and track plates and the links of the chain, and also afford means whereby the link 34$^a$ is held from opening under strain. The unit formed of the supporting frame with its wheels and endless element is adapted to be attached to any structure of the creeper type.

It is to be particularly noted that we use only two main chain engaging wheels 14 and 22 which are disposed in line with each other and along the longitudinal axis of the tractor element frame, and that one of these wheels, namely the wheel 22, is mounted for adjustment so that the slack in the chain may be taken up and that the wheels 28 are flanged, as illustrated most clearly in Figure 2, to engage upwardly projecting portions of the track plates 40 so that the track plates or grouser plates cannot slip laterally with relation to the wheels 28. This prevents any lateral dislocation or side slipping action while running on side hills or on uneven ground, the consequence of which side slipping or dislocation would be that the wheels would jump the track, thus causing delays and expensive repairs, particularly when reversing and when the slack of the chain is in the lower flight of the chain. If two or more chains were used disposed one on each side of the longitudinal axis, there is constant difficulty because of the impossibility of having both chains of exactly the same length. If there is an uneven lengthening of the chains, this will cause the buckling of the track plates on account of a tendency of the track plates to run in a curved line, especially when the machine is reversing. The provision of slack adjusting wheels where two chains are used will not prevent this buckling condition, but by having only one chain and one set of wheels 14 and 22, one of which wheels is a slack adjuster, the track plates can be kept in perfect line whether running forward or reversely.

Attention is particularly called to the milling out or recessing at 37 of the upper face of the track plate 36 to receive the lower portion of the link, as illustrated in Figures 3 and 4. This is done to take the bending strain off the clip bolts 39 and changes the strain from a bending strain to a tensional strain, and at the same time, the track being recessed to receive the link, the track plates take the load at the lower part of the link. The clamp 38, therefore, is not subjected to all of the strain, which is of a bending and shearing nature. Where two or more chains are used, as heretofore adverted to, one of these chains will be bound to take all the load and the other chain will be, to a certain extent, idle and consequently the clamps on the loaded chain will be subjected to all of the shearing strains and there will be non-alignment of the chain relative to the driving wheels which means excessive wear and breakage. It is further pointed out that the chain which we use is a common stock chain and does not require any special formation or construction.

The chain not only eliminates the use of connecting pins but distributes the strain previously applied to the individual pin, to each member of the endless chain, and as it is positioned in the concavity of the plate 36, which conforms to the contour of the connecting link of the chain, the strength of its connection to the plate 36 is greatly increased and the danger of breaking eliminated.

Furthermore, the bevelled end 44 of the grouser plate or shoe prevents wear, as there are no corners to grind on the adjacent grouser plate when the preceding plate is starting its upward movement with the chain.

While we have illustrated a certain specific embodiment of our invention, which we believe to be thoroughly effective and practical, yet it will be obvious that many changes might be made in the details of construction and arrangement of parts without departing from the spirit of the invention.

We claim:—

1. In a tractor driving unit for the purpose indicated, the combination with a frame, of driving and idler wheels respectively mounted on opposite ends of said frame, an endless tractor element operatively engaging about said wheels and comprising a chain having alternate horizontal and vertical links, track plates provided with grooves for the reception of certain sides of the vertical links, clamps engaging through the vertical links and bestraddling certain of their sides and being secured to the track plates, thereby holding the plates in position, said clamps engaging between the ends of the horizontal links, holding them in alignment and preventing the horizontal links from moving longitudinally toward each other during the travel of the endless tractor element, said wheels having flanges cooperating with the opposite ends of the clamps to prevent lateral movement of the track plates, and tread shoes carried by the plates.

2. In a drive chain, a link, a track plate provided with a longitudinally extending recess on its inner face at the center of the plate to receive a longitudinally extending portion of the link, to permit the plate to pivot on an axis axially aligned with said portion of the link, a clamp fitting over said link and being connected with the track plate and disposed transversely thereof and extending over said longitudinally extending portion of the link, said clamp having a portion engaging between and provided with means positively cooperating with the ends of said links, to permit them to positively pivot and prevent the links of the chain from moving toward each other during the travel of the chain.

3. An endless element composed of a series of connected links, the links being disposed in right angular relation to each other, a track plate, which has positive pivoted connections with the adjacent ends of adjacent links, means comprising a clamp carried by the track plate to pivotally mount the same for movement on an axis in alignment with one side of the link, said clamp having arcuate cut away portions to insure holding the adjacent ends of the adjacent links in positive pivotal connection with the link that carries the track plate.

4. An endless element composed of a series of connected links, the links being disposed in right angular relation to each other, track plates, clamps engaging through the vertical links of the endless element and secured to the track plates for pivotally mounting the same, said clamps having arcuate cut away portions to insure holding the adjacent ends of the adjacent links in positive pivotal connection with the links which carry the track plates, and shoes carried by the track plates and having overlapping engagement with each other when having tracting actions on the road bed.

In testimony whereof we hereunto affix our signatures.

JAMES W. McMILLAN.
EDWARD H. McMILLAN.